(12) United States Patent
Laubstein et al.

(10) Patent No.: US 8,912,455 B2
(45) Date of Patent: Dec. 16, 2014

(54) SCALE WITH AN ADJUSTING DEVICE CONFIGURED AS A FLUID DRIVE ACTUATOR IMPARTING GEARLESS TRANSLATIONAL MOTION TO PLACE THE SCALE IN A WASHING-DOWN POSITION OR IN A TRANSPORT POSITION

(75) Inventors: Michael Laubstein, Goettingen (DE); Juergen Lauke, Rosdorf (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 1046 days.

(21) Appl. No.: 12/793,966

(22) Filed: Jun. 4, 2010

(65) Prior Publication Data
US 2011/0132669 A1 Jun. 9, 2011

Related U.S. Application Data

(63) Continuation of application No. PCT/EP2008/008702, filed on Oct. 15, 2008.

(30) Foreign Application Priority Data

Dec. 4, 2007 (DE) .......................... 10 2007 058 330

(51) Int. Cl.
*G01G 23/02* (2006.01)
*G01G 21/28* (2006.01)

(52) U.S. Cl.
CPC ............. *G01G 21/286* (2013.01); *Y10S 901/22* (2013.01)
USPC ............... 177/180; 177/238; 901/22; 60/473; 60/474; 91/445; 92/129; 92/130 R; 92/85 R; 92/85 A

(58) Field of Classification Search
USPC .............. 91/445; 92/129, 130 R, 85 R, 85 A; 60/473–475; 901/22; 177/1, 180, 181, 177/238, 154, 184, 208, 209, 254
See application file for complete search history.

(56) References Cited

U.S. PATENT DOCUMENTS

| | | | | |
|---|---|---|---|---|
| 1,842,027 A | * | 1/1932 | Jonn | 55/437 |
| 2,200,392 A | * | 5/1940 | Goldberg | 60/417 |
| 2,311,864 A | * | 2/1943 | Parsons | 60/434 |
| 2,826,354 A | * | 3/1958 | Field | 137/899.4 |
| 3,217,818 A | * | 11/1965 | Engelsher et al. | 177/144 |
| 3,773,189 A | * | 11/1973 | Kitamura et al. | 414/753.1 |

(Continued)

FOREIGN PATENT DOCUMENTS

| | | |
|---|---|---|
| DE | 592 831 C | 2/1934 |
| DE | 2841996 A1 | 4/1980 |

(Continued)

OTHER PUBLICATIONS

PTO 14-1717, which is a translation of DD 155 925 A, Jan. 2014.*

(Continued)

*Primary Examiner* — Randy W Gibson
(74) *Attorney, Agent, or Firm* — Edell, Shapiro & Finnan, LLC

(57) ABSTRACT

A balance having at least one adjusting device (2, ...) having a drive, wherein the drive of the adjusting device is configured as a fluidic drive (4, ...), to which pressure can be applied by a pressure source disposed outside the scales via a pressure connection.

18 Claims, 4 Drawing Sheets

(56) References Cited

U.S. PATENT DOCUMENTS

| | | | |
|---|---|---|---|
| 3,971,296 A * | 7/1976 | Tugwell | 91/392 |
| 4,084,698 A * | 4/1978 | Niederer | 209/649 |
| 4,137,977 A * | 2/1979 | Alger | 177/146 |
| 4,267,767 A * | 5/1981 | Hodapp et al. | 91/404 |
| 4,365,928 A * | 12/1982 | Baily | 414/735 |
| 4,442,754 A * | 4/1984 | Jezbera | 91/1 |
| 4,673,048 A * | 6/1987 | Curran | 177/146 |
| 4,676,698 A * | 6/1987 | Krieger et al. | 405/302 |
| 4,735,292 A * | 4/1988 | Munz | 187/324 |
| 4,932,487 A * | 6/1990 | Melcher et al. | 177/50 |
| 5,058,692 A * | 10/1991 | Melcher et al. | 177/181 |
| 5,193,430 A * | 3/1993 | Ilgovsky | 92/13.1 |
| 5,703,334 A * | 12/1997 | Hansson et al. | 177/201 |
| 6,600,112 B2 * | 7/2003 | Iseli | 177/154 |
| 6,615,638 B1 * | 9/2003 | Lochner et al. | 73/1.74 |
| 6,797,893 B2 * | 9/2004 | Eaton et al. | 177/154 |
| 7,411,137 B2 * | 8/2008 | Sandberg et al. | 177/154 |
| 7,531,759 B2 * | 5/2009 | Luchinger et al. | 177/180 |
| 7,788,918 B2 * | 9/2010 | Huber et al. | 60/475 |
| 7,834,279 B2 * | 11/2010 | Macmichael | 177/238 |
| 2003/0140781 A1 * | 7/2003 | Weiss | 92/85 B |
| 2012/0144945 A1 * | 6/2012 | Bai et al. | 74/473.11 |
| 2012/0152109 A1 * | 6/2012 | Wagner et al. | 92/14 |

FOREIGN PATENT DOCUMENTS

| | | |
|---|---|---|
| DE | 155925 | 7/1982 |
| DE | 8508424.7 U1 | 6/1986 |
| DE | 8803709 U1 | 12/1988 |
| DE | 8803728.2 U1 | 8/1989 |
| DE | 9006644 U1 | 12/1990 |
| DE | 9114514.7 U1 | 7/1992 |
| DE | 42 35 250 C1 | 12/1993 |
| DE | 19838306 B4 | 4/1999 |
| DE | 198 28 515 A1 | 12/1999 |
| DE | 19828515 C2 | 12/1999 |
| DE | 29917940 U1 | 2/2000 |
| DE | 10025712 C2 | 12/2001 |
| DE | 101 46 421 A1 | 5/2002 |
| DE | 10149606 C2 | 5/2003 |
| DE | 20304465 | 9/2003 |
| DE | 102005018419 B4 | 11/2006 |
| DE | 102006008544 B4 | 8/2007 |
| DE | 202007005665 U1 | 8/2007 |
| EP | 0197982 B1 | 10/1986 |
| EP | 1146322 B1 | 10/2001 |
| EP | 1302757 A2 | 4/2003 |
| EP | 1416256 A1 | 5/2004 |
| EP | 1576343 B1 | 9/2005 |
| GB | 2 271 858 A | 4/1994 |
| WO | 00/37899 A1 | 6/2000 |
| WO | WO 2006030171 A1 | 3/2006 |
| WO | WO 2007005145 A2 | 1/2007 |

OTHER PUBLICATIONS

Braun, M. "Prazisionswagetechnik fuer industrielle Applikationen", Waegen und dosieren May 1997, pp. 6-14.

Kochsiek, "Handbuch des Waegens" 2. edition 1989, pp. 166-167, 179, 182-183 EN 45501; p. 9 of 1992.

Kuhlenkamp, A. "Lexikon der Feinwerktechnik" vol. 13, 1968, p. 517.

Office action from the German PTO, Nov. 11, 2008.

* cited by examiner

SCALE WITH AN ADJUSTING DEVICE CONFIGURED AS A FLUID DRIVE ACTUATOR IMPARTING GEARLESS TRANSLATIONAL MOTION TO PLACE THE SCALE IN A WASHING-DOWN POSITION OR IN A TRANSPORT POSITION

This is a Continuation of International Application PCT/EP2008/008702, with an international filing date of Oct. 15, 2008, which was published under PCT Article 21(2) in German, and the complete disclosure of which, including amendments, is incorporated into this application by reference.

FIELD AND BACKGROUND OF THE INVENTION

The present invention relates to a set of scales having at least one adjusting device provided with a drive.

In particular in precision scales or analytical scales, electric motors, usually configured as DC motors, are used for various adjusting functions.

In some cases, differently dimensioned motors are used for the different adjusting functions. Alternatively, for production or cost reasons, identical motors may be used, but then these motors are not optimally configured for their respective purposes.

DE 90 06 644 U1 discloses a set of scales with a wind shield which is moved by a motor. A wall element of a weighing chamber surrounding the scale pan is moved by an electric motor. A sensor serves to detect the position of the wall element.

In the case of known automatic weight switching for a set of scales, an adjusting weight lies on a weight support which can be lowered or raised through tilting about a tilt axis. Arranged parallel to the tilt axis is a rotation axis with an eccentrically mounted cam disk. A contact surface of the weight support, which is arranged at a right angle to the cam disk, is pressed by a spring against the cam disk. The rotation axis is driven by a DC motor via a gearbox. In order to fix the position of the eccentrically mounted cam disk or of the weight support, two disks with control cams are arranged on the rotation axis, whereby the control cams actuate switches assigned thereto in their respective predetermined end positions. Although this weight switching system has proved to be essentially effective in practice, the control cams with switches render the system relatively costly and also relatively bulky, due to the electric motor and the gearbox that are used.

A motor-driven weight switching and locking system is disclosed in, for example, DE 42 35 250 C1. A set of scales with a motor-driven movable contact surface is known, for example, from DE 198 28 515 A1. This set of scales using the principle of electromagnetic force compensation has a vertically movable load support, a position sensor, a variable gain amplifier and a coil in a magnetic field of a permanent magnet, as well as at least one contact surface which delimits the downward movement of the load support, at least one contact surface which delimits the upward movement of the load support and an electronic evaluation unit. At least one of the contact surfaces is movable. The movable contact surface is controlled with the aid of the position sensor such that the load support is held as far as possible in the same position as in normal weighing operation.

DE 28 41 996 C2 discloses a weight switching system for a beam balance, particularly for an analytical balance, comprising a plurality of cam shafts for lifting/lowering the weights and an electric motor drive that controls the cam shafts via sensors.

It is common to all the known sets of scales that the electric motors used are relatively bulky and require relatively complex gearboxes.

A further disadvantage is that due to the power dissipation that occurs from the electric motors, an undesirable level of heat can be generated. The electric motors can also produce undesirably large magnetic fields. The use of electric motors can also give rise to problems in explosion hazard areas.

OBJECTS AND SUMMARY OF THE INVENTION

It is an object of the present invention to improve upon the known adjusting devices. Preferably, they should be configured as small as possible and should be capable of being used in a set of scales in as versatile a manner as possible. In addition, undesirable heat production by the electric motors should be avoided as far as possible. Gearboxes should also be avoided if and where possible. The construction of such adjusting devices is to be improved overall.

According to one formulation of the invention, this aim is achieved in that the drive of the adjusting device is configured as a fluid drive to which pressure is applied, via a pressure connection, from a pressure source arranged outside the set of scales.

Persons skilled in the art have previously striven to provide the scales intended particularly for use in automated systems with adjusting devices each having an individual electric drive. Persons skilled in the art have previously been so wedded to this concept that they strove, at most, to provide adjusting devices with individual drives of types other than electric motors, such as, for example, piezoelectric drives.

It has proven to be particularly useful, in systems for which a pneumatic or hydraulic pressure source providing pressure as auxiliary energy is available anyway, to connect in sets of scales in which the drive of the adjusting device is configured as a fluid drive. Sets of scales of this type can also be used in laboratory rooms which are connected to a central pressure supply.

The adjusting devices and their drives can be configured to be relatively small and be adapted to different tasks through use of suitable valves. For the pressure supply, the set of scales requires only a suitable pressure connection. Gearboxes can be largely dispensed with, particularly in the case of straight-line movements such as displacement motion. The familiar heat generation from electric motors in the set of scales is also absent, which is advantageous particularly when used in sets of scales configured as comparators.

In essence, the adjusting device is also regulable in conjunction with an external position sensor, e.g., together with a microcontroller or control unit which controls the adjusting device.

According to a preferred embodiment of the invention, the drive is configured as a one-sided pressure cylinder, which works against a spring and has a longitudinally displaceable actuator. This has the dual advantage that, firstly, for displacement in the opposing direction, a second one-sided pressure cylinder can be dispensed with and, secondly, the spring ensures a predetermined position when in a pressure-free state.

According to a further preferred embodiment of the invention, the drive is configured as a two-sided pressure cylinder having a longitudinally-displaceable actuator. Even in this embodiment, a second pressure cylinder can be dispensed with for displacement in the opposing direction. The working pressure is merely switched from a first chamber to a second chamber, which is situated on the other side of the piston moving the actuator.

According to a further preferred embodiment, at least one control valve is connected upstream of the drive. The actuator can be moved via the control valve and, provided the control valve is regulable, the speed of the actuator can be regulated or controlled. In order to ensure gentle ramping up and down of the actuator motion, the drive is coupled to a damping member which is configured, for example, as a throttle valve.

According to a further preferred embodiment of the invention, the adjusting device is configured for moving a wall element of a wind shield. Thus a wall element or a wind shield door can be moved easily and inexpensively.

According to another preferred embodiment of the invention, the adjusting device is configured for adjusting at least one weight in a weight switching system. The weight which lies on a weight support that can be lowered or raised by the adjusting device is placed and/or raised on a force transmitting point of the set of scales.

In order to be able to move even relatively heavy weights, the weight support can be lowered or raised through tilting about a tilt axis. Advantageously, this arrangement enables one to dispense with a rotation axis arranged parallel to the tilt axis and having an eccentrically mounted cam disk and a gearbox between the drive and the rotation axis.

According to a preferred embodiment of the invention, in a washing-down position for washing or rinsing, a load support is pressed by the actuator of the adjusting device with a rearward sealing edge facing toward the scales unit housing against a seal arranged between the load support and the scales unit housing in sealing manner. It is also fundamentally possible to configure the rearward edge of the load support, which is, for example, a scale pan, as a seal and to press this seal in sealing manner against the adjacent scales unit housing with the aid of the actuator.

This represents a simple and reliable arrangement for preventing cleaning or washing-down fluid from penetrating between the load support and the housing surface into the set of scales or the housing thereof during cleaning or washing-down of the set of scales.

According to a further preferred embodiment, the load support comprises, at the support axis bearing said load support, a contact surface or pusher against which the actuator rests in the washing-down position, pulling parallel to the support axis, with a contact surface or pusher.

According to a preferred embodiment, the adjusting device is configured as a transport securing device, which locks the set of scales in a pressure-free condition by spring force. For locking, the actuator of the adjusting device engages in a corresponding aperture of the load support. Additionally, for locking, the load support can also be pressed against a contact surface by the actuator of the adjusting device.

Additionally or alternatively, the actuator of a further adjusting device can also engage in locking manner in a corresponding aperture of a load transmitting lever of the weighing system. Alternatively, in order to lock the load transmitting lever of the weighing system, the load transmitting lever can be pressed against a contact surface by the actuator.

BRIEF DESCRIPTION OF THE DRAWINGS

Further details of the invention are disclosed in the following detailed description and in the attached drawings, illustrating preferred embodiments of the invention by way of example, in which.

DETAILED DESCRIPTION OF PREFERRED EMBODIMENTS

Figure 1:
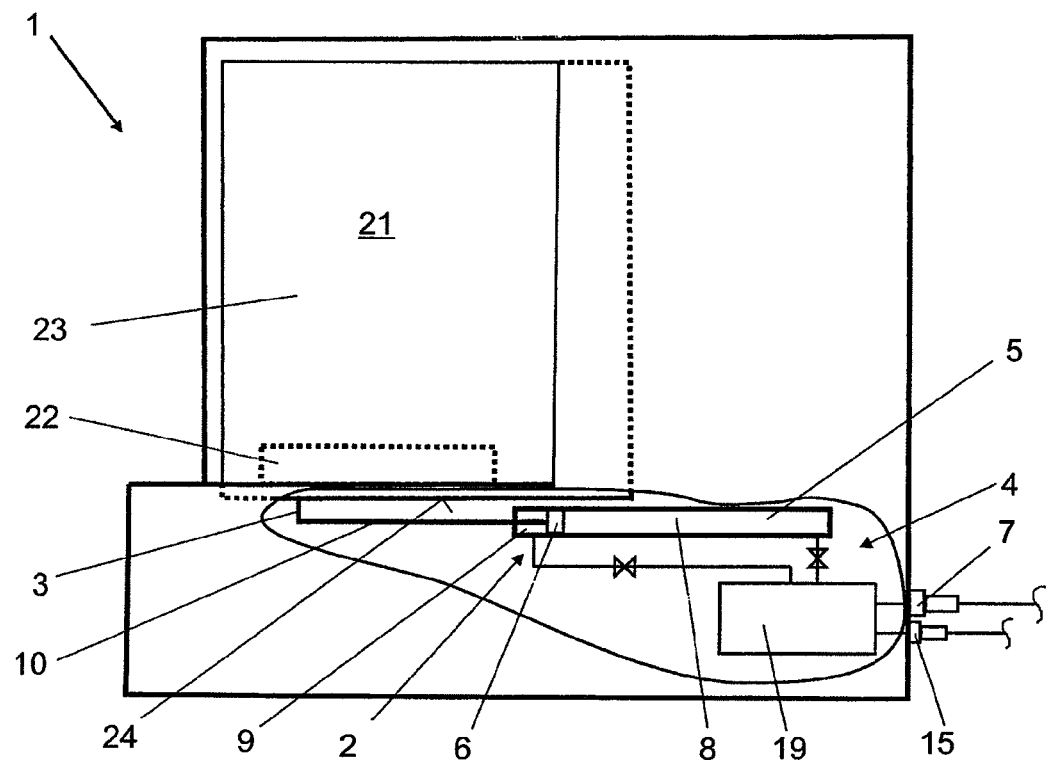
FIG. 1 is a side view of a set of scales including a displaceable wall element of a wind shield in a reduced representation.

A set of scales 1 has at least one adjusting device 2. The adjusting device 2 essentially comprises an actuator 3 which is driven by a fluid drive 4.

The drive 4 is constructed from a pressure cylinder 5 in which pressure from a pressure source (not shown) arranged external to the set of scales 1 is applied to a longitudinally displaceable piston 6 via a pressure connection 7.

Figure 8:
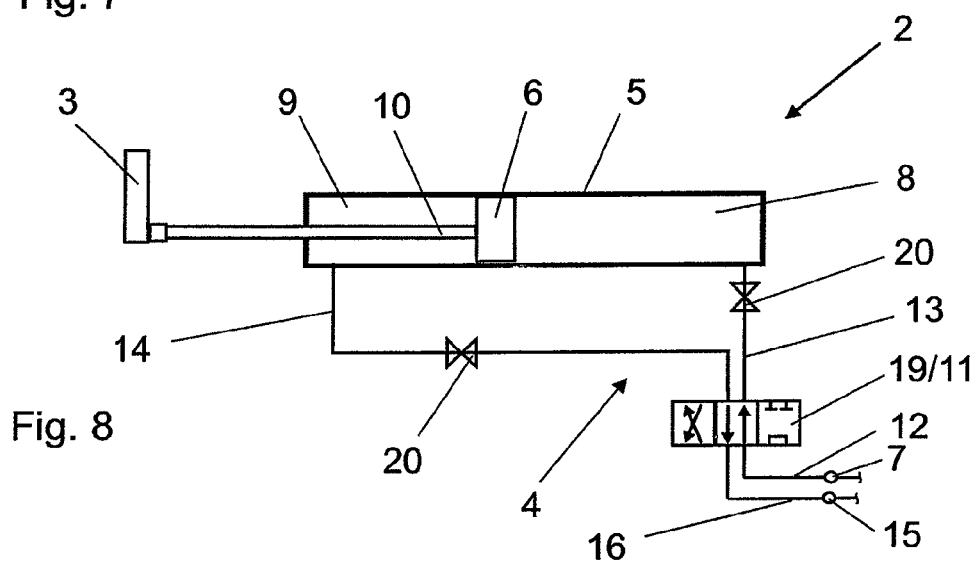
FIG. 8 shows a schematic representation of an adjusting device with a two-sided pressure cylinder as the drive.

The pressure cylinder 5 can be configured, as per FIGS. 1 and 8, as a two-sided pressure cylinder which is divided by the piston 6 into a first chamber 8 and a second chamber 9. During a forward stroke, pressure is applied to the first chamber 8 and, during a backward stroke, to the second chamber 9. The piston 6 comprises a piston rod 10 at the free end of which, and remote from the piston 6, the actuator 3 is arranged. A control valve 19 configured as a multi-way valve 11 (see FIG. 8) optionally connects a pressure line 12 coming from the pressure connection 7 to a first line 13 which leads to the first chamber 8 or to a second line 14 which leads to the second chamber 9. If the first line 13 is connected to the pressure line 12, the second line 14 is connected via the multi-way valve 11, via a return connection 15 to a return line 16. In the case of a pneumatic drive, the compressed air fed back via the return line 16 can be released to the atmosphere, whereas in the case of a hydraulic drive, the hydraulic fluid fed back via the return line 16 is returned to a hydraulic tank (not shown).

As shown in FIGS. 3 to 7 and 9, in a further embodiment, the pressure cylinder 5', 5", 5''' is configured as a one-sided pressure cylinder 5', 5", 5''' acting against a spring 17, 17", 17''', 17'''', 18.

Figure 9:
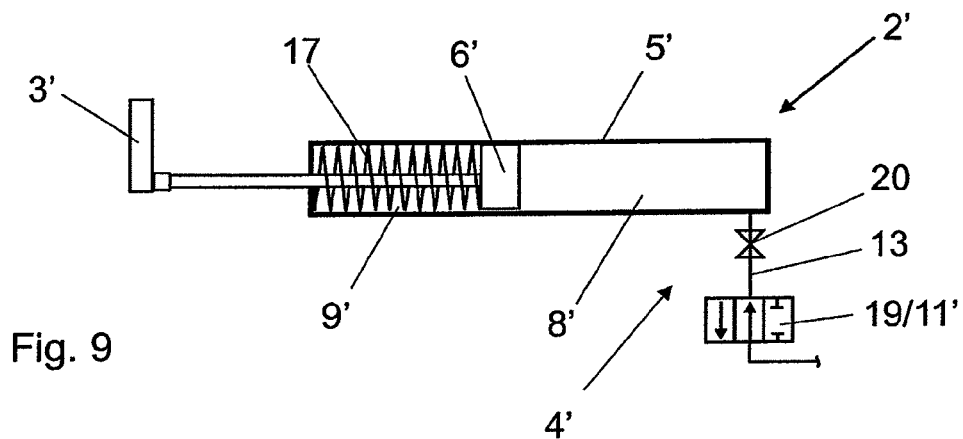
FIG. 9 shows a schematic representation of an adjusting device with a one-sided pressure cylinder, acting against a spring, as the drive.

According to FIG. 9, the spring 17 is configured as a compression spring and is arranged in the second chamber 9'. According to FIG. 7, the spring 17'''' is configured as a compression spring and is arranged in the first chamber 8''''.

Figure 3:
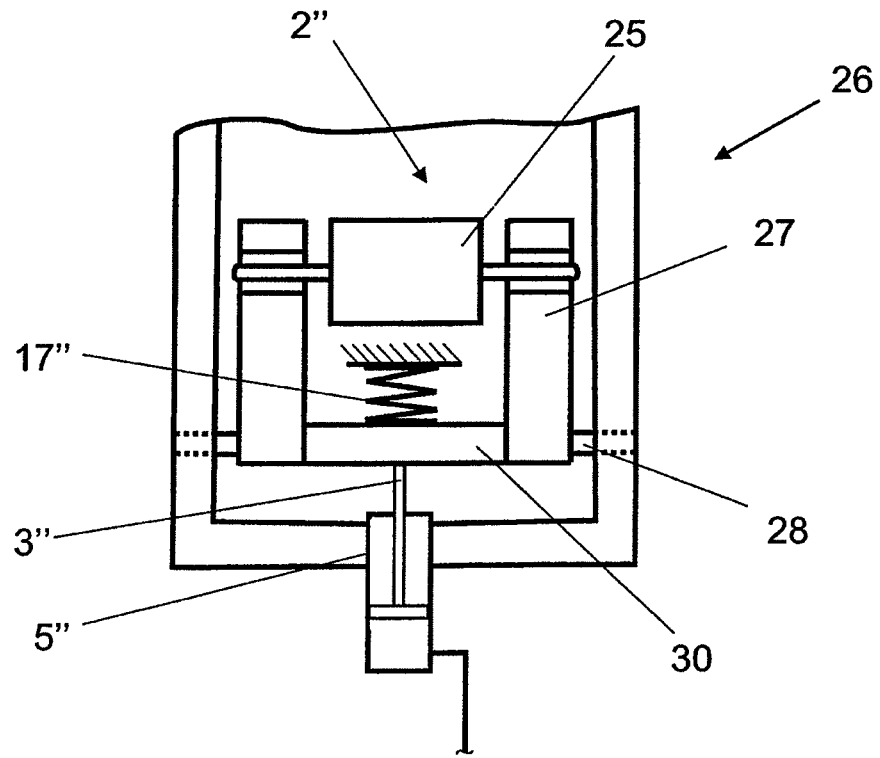
FIG. 3 is a plan view of a weight switching system comprising a tiltable weight support.
Figure 4:
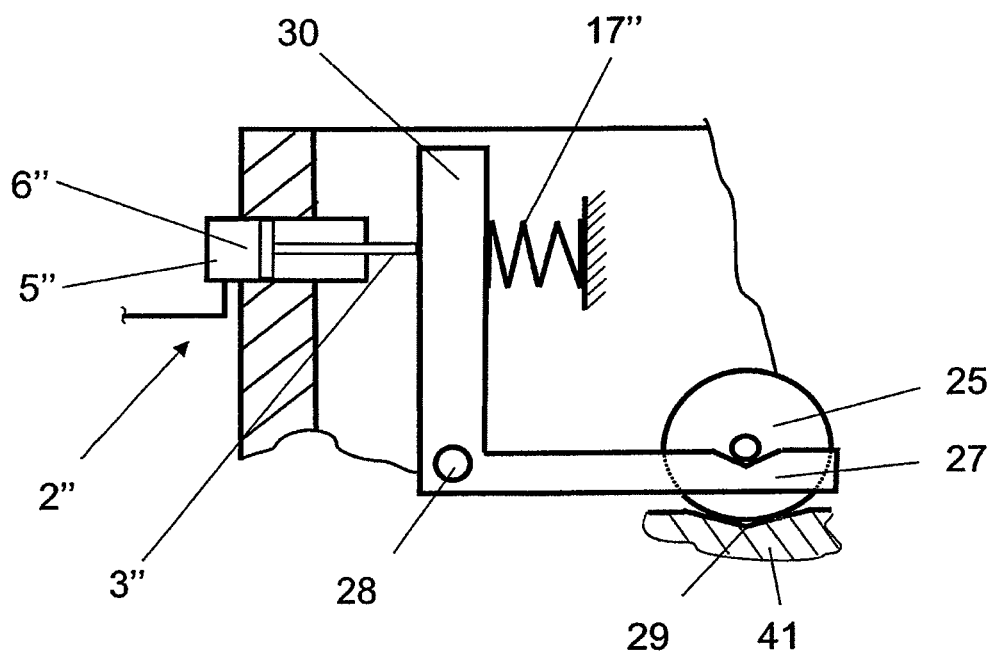
FIG. 4 is a side view of the weight support of FIG. 3 in outline and partially in section.

According to FIGS. 3 and 4, the spring 17" can also be arranged outside the pressure cylinder 5", acting against the piston 6" and the actuator 3".

Figure 5:
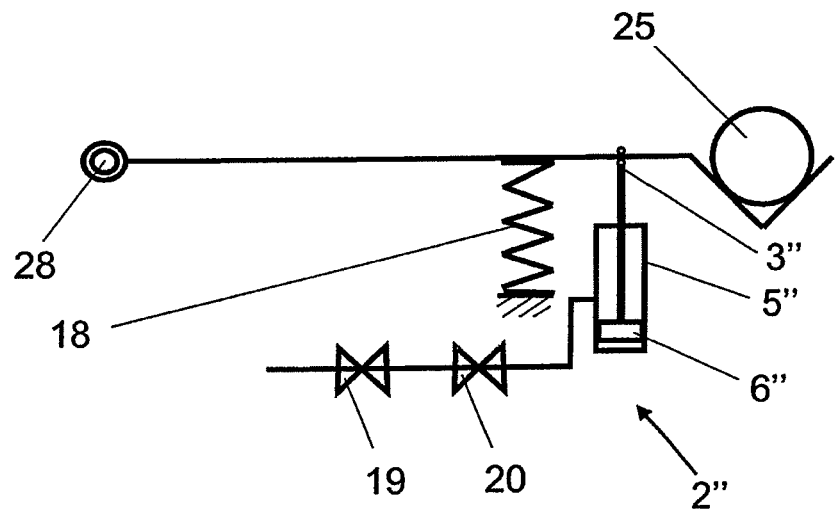
FIG. 5 is a schematic side view of a further weight support.

According to FIG. 5, the spring 18 is configured as a tension spring arranged parallel to the pressure cylinder 5", and acting against the piston 6".

Figure 6:
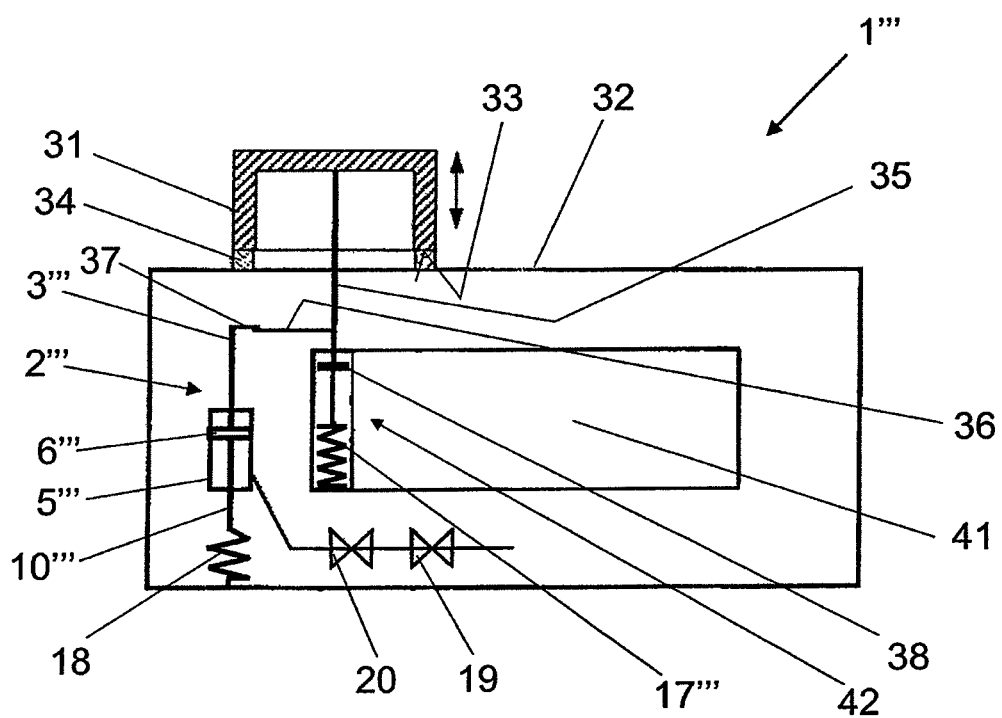
FIG. 6 is a schematic side view of a set of scales with the load support in the washing-down position.

According to FIG. 6, the pressure cylinder 5''' is configured so that the piston 6''' comprises a two-sided piston rod 10''', on the second end of which, facing away from the actuator 3''', the spring 18 configured as a tension spring engages, acting against the piston 6'''.

A control valve 19, which is configured, according to FIGS. 1, 8 and 9, as a multi-way valve 11, 11', is arranged upstream of the fluid drive 4, 4', 4", 4'".

Throttle valves 20 are arranged in the lines 13, 14 as damping members.

Figure 2:
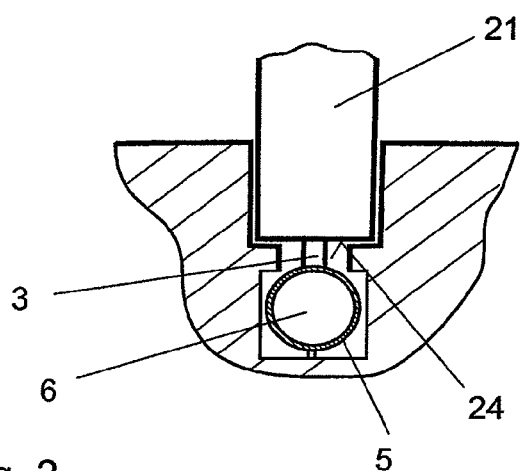
FIG. 2 is a rear view of the displaceable wall element of FIG. 1 in section and outline.

According to FIGS. 1 and 2, the adjusting device 2 is used for translational movement of a wall element 21 of a wind shield of a set of scales 1. The wind shield consists of a scale chamber 23 enclosing a scale pan 22 which is accessible by sliding the wall element 21. At a lower end in the vertical direction, the actuator 3 is linked at the underside 24 of the wall element 21 to the wall element 21. This wall element 21 is thus displaceable by the adjusting device 2 or the actuator 3 arranged on the piston rod 10.

According to the embodiment of FIGS. 3 and 4 and the embodiment of FIG. 5, the adjusting device 2" is configured for adjusting a weight 25 in a weight switching system 26. The weight 25 lies on a weight support 27 which can be lowered by the adjusting device 2" through tilting about a tilt axis 28 and can be raised by adjustment in the opposite direction. Accordingly, by lowering the weight support 27, the weight 25 is placed on a force transmitting point 29 or a force transmitting support. The weight support 27 is configured as a fork-shaped elbow lever on the angled end 30 of which, firstly, the actuator 3" of the adjusting device 2" and, secondly, the compression spring 17" engages. According to the embodiment of FIG. 5, the actuator thereof 3" and the spring 18 engage on the same side of the weight support 27. The spring 18 is configured as a compression spring.

According to the embodiment of FIG. 6, the set of scales 1'" comprises a load support 31 which, in a washing-down position, is pressed by the actuator 3'" of the adjusting device 2'" with a rearward sealing edge 33 that faces toward a scale housing 32, in sealing manner, against a seal 34 arranged between the load support 31 and the scale housing 32. For this purpose, arranged on the support axis 35 which supports the load support 31 is a contact surface 36. The actuator 3'" engages, with an actuator contact surface 37, against this contact surface 36 in the washing-down position, and in pulling manner, parallel to the support axis 35. In the process, the actuator 3'" actuates an overweight protection system 42 of a weighing system 41, such that the overweight protection system pulls the contact surface 38 arranged on the support axis 35 out of the stop position thereof in the direction toward the spring 17'". The spring 17'" is configured as a compression spring and acts as an overweight protection spring. For this purpose, the spring 18, which is configured as a tension spring and acts in pulling manner on the piston rod 10'", must have a greater spring force than the spring 17'" in order that the overweight protection system 42 is actuated in the pressure-free condition of the pressure cylinder 5'".

Figure 7:
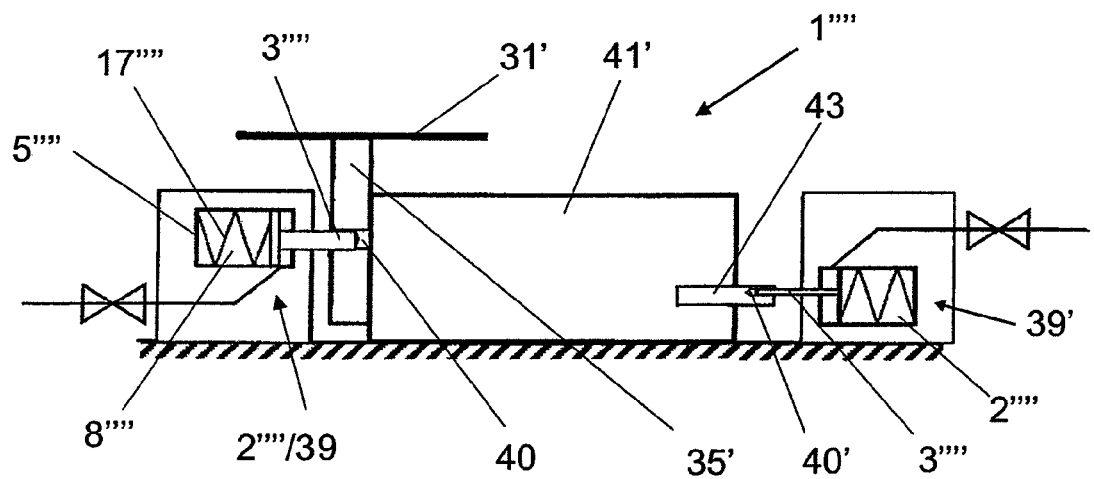
FIG. 7 shows a schematic side view of a set of scales in a locked state.

According to the exemplary embodiment of FIG. 7, the adjusting device 2"" is configured as a transport securing device 39 which locks the set of scales 1"" in a pressure-free condition of the pressure cylinder 5"" by the force of the spring 17"". For the purpose of locking, the actuator 3"" of the adjusting device 2"" engages in a corresponding aperture 40 in the support axis 35' of the load support 31' in locking manner.

A further transport securing device 39' is correspondingly configured. In this case, in order to lock the actuator (3""), the adjusting device (2"") engages in a corresponding aperture (40') of a load transmitting lever 43 of a weighing system 41' in locking manner.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A set of scales, configured as a precision balance or an analytical balance, for weighing a load to be weighed comprising:
    at least one component integral to the set of scales,
    a scales unit housing, and
    at least one adjusting device having a respective drive,
        wherein each said drive of each said adjusting device consists of a gearless, non-pivoting actuator configured as a respective fluid drive,
        wherein each said drive is arranged within the scales unit housing and in communication with at least one pressure connection configured to apply pressure to said respective drive from a pressure source arranged outside the scales unit housing, and
        wherein each said adjusting device is configured to impart exclusively translational motion to said at least one component.

2. The set of scales as claimed in claim 1, wherein the drive is configured as a one-sided pressure cylinder working against a spring and wherein the actuator is longitudinally displaceable.

3. The set of scales as claimed in claim 1, wherein the drive is configured as a two-sided pressure cylinder and wherein the actuator is longitudinally displaceable.

4. The set of scales as claimed in claim 1, further comprising at least one control valve connected upstream of the drive.

5. The set of scales as claimed in claim 1, wherein the drive is coupled to at least one damping member configured to dampen the translational motion.

6. The set of scales as claimed in claim 5, wherein the damping member is configured as a throttle valve.

7. The set of scales as claimed in claim 4, further comprising at least one position sensor arranged to detect end positions of the adjusting device.

8. The set of scales as claimed in claim 1, wherein the position of the actuator of the adjusting device is a time-dependent determination.

9. A set of scales, configured as a precision balance or an analytical balance, for weighing a load to be weighed comprising:
    a component integral to the set of scales,
    a scales unit housing, and
    an adjusting device having a drive,
        wherein the drive of the adjusting device comprises a gearless actuator configured as a fluid drive,
        wherein the drive is arranged within the scales unit housing and in communication with a pressure connection configured to apply pressure to the drive from a pressure source arranged outside the scales unit housing,
        wherein the adjusting device is configured to impart translational motion to the component, and
        wherein the component is a wall element of a wind shield of the scales unit housing.

10. The set of scales as claimed in claim 1, wherein the component is at least one weight in a weight switching system.

11. The set of scales as claimed in claim 10, further comprising a weight support configured to receive the weight arranged to be lowered and raised by the adjusting device, wherein the weight is provided on a force transmitting point of the set of scales.

12. The set of scales as claimed in claim 11, wherein the weight support is arranged to be lowered and raised through tilting about a tilt axis.

13. A set of scales, configured as a precision balance or an analytical balance, for weighing a load to be weighed, comprising:
   a component integral to the set of scales,
   a scales unit housing, and
   an adjusting device having a drive,
   wherein the drive of the adjusting device comprises a gearless actuator configured as a fluid drive,
   wherein the drive is arranged within the scales unit housing and in communication with a pressure connection configured to apply pressure to the drive from a pressure source arranged outside the scales unit housing,
   wherein the adjusting device is configured to impart translational motion to the component, and
   wherein, in a washing-down position, a load support is pressed by the actuator of the adjusting device with a rearward sealing edge facing toward the scales unit housing against a seal arranged between the load support and the scales unit housing in sealing manner.

14. The set of scales as claimed in claim 13, wherein the load support comprises, at the support axis bearing the load support, a contact surface against which the actuator rests in the washing-down position, in accordance with a spring pull extending in parallel to the support axis.

15. A set of scales, configured as a precision balance or an analytical balance, for weighing a load to be weighed comprising:
   a component integral to the set of scales,
   a scales unit housing, and
   an adjusting device having a drive,
   wherein the drive of the adjusting device comprises a gearless actuator configured as a fluid drive,
   wherein the drive is arranged within the scales unit housing and in communication with a pressure connection configured to apply pressure to the drive from a pressure source arranged outside the scales unit housing,
   wherein the adjusting device is configured to impart translational motion to the component,
   wherein the adjusting device is configured as a transport securing device, which locks the set of scales in a pressure-free condition by spring force, and
   wherein, for locking, the actuator of the adjusting device is configured to:
      engage in locking manner in a corresponding aperture of a load transmitting lever of a weighing system and/or press the load transmitting lever of the weighing system against a contact surface.

16. The set of scales as claimed in claim 15, wherein, for locking, the actuator of the adjusting device is configured to engage in locking manner in the corresponding aperture of the load transmitting lever of the weighing system.

17. The set of scales as claimed in claim 15, wherein, for locking, the actuator of the adjusting device is configured to press the load transmitting lever of the weighing system against the contact surface.

18. The set of scales as claimed in claim 1, wherein the fluid drive comprises at least one of a pneumatic drive and a hydraulic drive.

* * * * *